US011956353B2

(12) United States Patent
Mihara

(10) Patent No.: US 11,956,353 B2
(45) Date of Patent: Apr. 9, 2024

(54) MACHINE LEARNING DEVICE, MACHINE LEARNING SYSTEM, AND MACHINE LEARNING METHOD

(71) Applicant: EAGLYS Inc., Tokyo (JP)

(72) Inventor: Kentaro Mihara, Tokyo (JP)

(73) Assignee: EAGLYS Inc., Tokyo (JP)

( * ) Notice: Subject to any disclaimer, the term of this patent is extended or adjusted under 35 U.S.C. 154(b) by 0 days.

(21) Appl. No.: 18/368,572

(22) Filed: Sep. 15, 2023

(65) Prior Publication Data

US 2024/0007287 A1 Jan. 4, 2024

Related U.S. Application Data

(63) Continuation of application No. PCT/JP2022/043196, filed on Nov. 22, 2022.

(30) Foreign Application Priority Data

Dec. 1, 2021 (JP) ................................. 2021-195808

(51) Int. Cl.
*H04L 9/08* (2006.01)
*G06V 10/82* (2022.01)
(Continued)

(52) U.S. Cl.
CPC .............. *H04L 9/088* (2013.01); *G06V 10/82* (2022.01); *H04L 9/008* (2013.01); *H04L 9/0618* (2013.01)

(58) Field of Classification Search
CPC ....... H04L 9/088; H04L 9/008; H04L 9/0618; G06V 10/82
See application file for complete search history.

(56) References Cited

U.S. PATENT DOCUMENTS 11,368,279 B2 * 6/2022 Hoshizuki ................ G06N 3/04
2019/0012579 A1 1/2019 Namiki
(Continued)

FOREIGN PATENT DOCUMENTS

| JP | 2019-15654 A | 1/2019 |
|---|---|---|
| JP | 2019-46460 A | 3/2019 |
| JP | 2020-177223 A | 10/2020 |

OTHER PUBLICATIONS

International Search Report for PCT/JP2022/043196 dated Jan. 24, 2023.
(Continued)

*Primary Examiner* — Meng Li
(74) *Attorney, Agent, or Firm* — Yokoi & Co., U.S.A.; Toshiyuki Yokoi

(57) ABSTRACT

Provided with a technology of a machine learning using a convolutional neural network depending on practical calculation cost and security level desired by a user. A machine learning device includes: a data acquisition unit configured to acquire an image data; and a machine learning calculation unit configured to execute a calculation based on the image data using a convolutional neural network, wherein the convolutional neural network comprises a plurality of layers, the machine learning calculation unit includes: an encryption processing unit configured to execute the calculation by a homomorphic encryption in an encryption execution area; a plaintext processing unit configured to execute the calculation in a plaintext encryption area; and a reception unit configured to receive a layer designation information for designating an N-th layer which is an intermediate layer between an input layer and an output layer of the convolutional neural network, the encryption processing unit is configured to execute the calculation from the input layer to the N-th layer, and the plaintext processing unit is configured to execute the calculation from the (N+1)-th layer to the output layer.

9 Claims, 14 Drawing Sheets

(51) Int. Cl.
  *H04L 9/00* (2022.01)
  *H04L 9/06* (2006.01)

(56) References Cited

U.S. PATENT DOCUMENTS

| | | | |
|---|---|---|---|
| 2019/0065974 A1 | 2/2019 | Michigami | |
| 2020/0082259 A1* | 3/2020 | Gu | G06N 3/08 |
| 2020/0313849 A1* | 10/2020 | Kar | G06N 3/08 |
| 2020/0328882 A1 | 10/2020 | Hoshizuki | |
| 2022/0116198 A1* | 4/2022 | Na | H04L 9/3093 |

OTHER PUBLICATIONS

PCT written opinion dated Jan. 24, 2023.
Japanese decision to grant a patent dated Apr. 1, 2022.
Ryffel, Theo et al., Partially Encrypted Machine Learning using Functional Encryption, arXiv.org [online], arXiv:1905.10214v5, Cornell University, Sep. 2021, pp. 1-12, [retrieval date Jan. 16, 2023], internet:<URL: https://arxiv.org/abs/1905.10214v5> abstract, chapter 3.2, Fig. 3.

\* cited by examiner

| ID | key1 | key2 |
|---|---|---|
| 000001 | 0KJFDEMNFS679FDDFHKL... | 2SFSHLJHFSKLJADL7DJLH... |
| 000002 | 43JFLKEJFDHKLFS3JKLFN... | FDLK732492SFGKJHKSDH... |
| 000003 | JLKJ02SFHL89JLKHJKF897... | 40389439LFKSJFLKJFSLH... |

MACHINE LEARNING DEVICE, MACHINE LEARNING SYSTEM, AND MACHINE LEARNING METHOD

TECHNICAL FIELD

The present disclosure relates to a machine learning device, a machine learning system, a machine learning method and a machine learning program.

BACKGROUND ART

In recent years, complicated data can be analyzed precisely by image recognition using a learning model of a convolutional neural network.

On the other hand, when the object to be analyzed is sensitive data which is directly connected to individual privacy such as medical image, it is required to perform analysis processing in a state that privacy information is concealed (encrypted).

For example, Patent document 1 discloses the technology related to the system of neural network using a homomorphic encryption.

PRIOR ART DOCUMENTS

Patent Documents

[Patent document 1] Japanese Patent Application Publication No. 2019-46460

DISCLOSURE OF THE INVENTION

Problems to be Solved by the Invention

The analysis processing can be performed in a state that the privacy information is encrypted by executing the image recognition by the convolutional neural network using the homomorphic encryption. However, although security level is generally high in the calculation using the homomorphic encryption, there is a problem that calculation quantity becomes enormous and it is difficult to execute the calculation at a practical calculation cost.

The present disclosure is made for solving the above described problems and the purpose of the present disclosure is to provide the technology related to the machine learning using the convolutional neural network depending on the practical calculation cost and the security level desired by a user.

Means for Solving the Problem

In order to achieve the above described purpose, the machine learning device of the present disclosure includes: a data acquisition unit configured to acquire an image data; and a machine learning calculation unit configured to execute a calculation based on the image data using a convolutional neural network, wherein the convolutional neural network comprises a plurality of layers, the machine learning calculation unit includes: an encryption processing unit configured to execute the calculation by a homomorphic encryption in an encryption execution area; a plaintext processing unit configured to execute the calculation in a plaintext encryption area; and a reception unit configured to receive a layer designation information for designating an N-th layer which is an intermediate layer between an input layer and an output layer of the convolutional neural network, the encryption processing unit is configured to execute the calculation from the input layer to the N-th layer, and the plaintext processing unit is configured to execute the calculation from the (N+1)-th layer to the output layer.

In order to achieve the above described purpose, the machine learning system of the present disclosure includes: a data acquisition unit configured to acquire an image data; and a machine learning calculation unit configured to execute a calculation based on the image data using a convolutional neural network, wherein the convolutional neural network comprises a plurality of layers, the machine learning calculation unit includes: an encryption processing unit configured to execute the calculation by a homomorphic encryption in an encryption execution area; a plaintext processing unit configured to execute the calculation in a plaintext encryption area; and a reception unit configured to receive a layer designation information for designating an N-th layer which is an intermediate layer between an input layer and an output layer of the convolutional neural network, the encryption processing unit is configured to execute the calculation from the input layer to the N-th layer, and the plaintext processing unit is configured to execute the calculation from the (N+1)-th layer to the output layer.

In order to achieve the above described purpose, the machine learning method of the present disclosure includes: a step of acquiring an image data; and a step of executing a calculation based on the image data using a convolutional neural network, wherein the convolutional neural network comprises a plurality of layers, the step of executing the calculation based on the image data using the convolutional neural network includes: a step of executing the calculation by a homomorphic encryption in an encryption execution area; a step of executing the calculation in a plaintext encryption area; and a step of receiving a layer designation information for designating an N-th layer which is an intermediate layer between an input layer and an output layer of the convolutional neural network, the calculation from the input layer to the N-th layer is executed in the encryption execution area, and the calculation from the (N+1)-th layer to the output layer is executed in the plaintext encryption area.

In addition, in order to achieve the above described purpose, the machine learning program of the present disclosure is executed by a computer having a control unit and a storage unit, wherein the machine learning program including: a step of acquiring the image data by the control unit; a step of storing the image data by the storage unit; and a step of executing a calculation based on the image data using a convolutional neural network by the control unit, the convolutional neural network comprises a plurality of layers, the step of executing the calculation using the convolutional neural network includes: a step of executing the calculation by a homomorphic encryption in an encryption execution area; a step of executing the calculation in a plaintext encryption area; and a step of receiving a layer designation information for designating an N-th layer which is an intermediate layer between an input layer and an output layer of the convolutional neural network, the calculation from the input layer to the N-th layer is executed in the encryption execution area, and the calculation from the (N+1)-th layer to the output layer is executed in the plaintext encryption area.

Effects of the Invention

The present disclosure can achieve the machine learning using the convolutional neural network depending on the practical calculation cost and the security level desired by a user.

MODES FOR CARRYING OUT THE INVENTION

Hereafter, the embodiments of the present disclosure will be explained with reference to the drawings. In all drawings explaining the embodiments, the same reference signs are assigned to the common component to omit the repeated explanation. Note that the following embodiments do not unreasonably limit the content of the present disclosure described in the claims. In addition, all components disclosed in the embodiments are not necessarily essential components of the present disclosure.

<Outline of Present Invention>

In recent years, the image recognition can be performed precisely using the convolutional neural network and the cases of analyzing complicated data are increased. When sensitive data such as personal information is included in an image data which is the target of the image recognition, it is required to consider privacy. When the image recognition is performed by using the homomorphic encryption where the calculation process related to the convolutional neural network can be executed in the encrypted state, the analysis processing can be performed while protecting privacy.

However, although security level is generally high in the calculation using the homomorphic encryption, there is a problem that calculation cost becomes enormous. In order to solve the above described problem, the present invention focused on the fact that it becomes difficult to visually identify the image in the process of repeating the filtering processing of the convolution operation in the image recognition using the convolutional neural network. Namely, in the present invention, the calculation is executed by the homomorphic encryption in an encryption execution area until a predetermined calculation process preliminarily determined by the user, and the calculation is executed in a plaintext encryption area after the predetermined calculation process.

After the predetermined calculation process, the calculation is executed in the plaintext encryption area since it is difficult to visually identify the image. Thus, even if the image in the calculation process is leaked to a third party, it is difficult to visually identify the image. Consequently, the content of the sensitive data is prevented from being known by a third party even when the sensitive data is not encrypted. At the same time, the calculation cost can be suppressed since it can be avoided to execute all calculation processes by the homomorphic encryption in the encryption execution area.

Embodiment 1

(Configuration of Machine Learning System 1)

Figure 1:
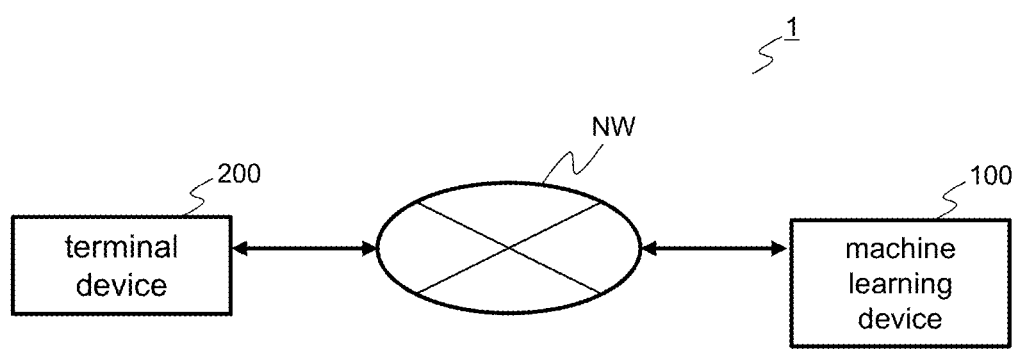
FIG. 1 is a drawing showing a machine learning system 1.

FIG. 1 is a drawing showing a machine learning system 1. As shown in FIG. 1, the machine learning system 1 of the present embodiment includes a machine learning device 100 and one or more terminal devices 200 used by users.

The machine learning device 100 and the terminal device 200 are communicatively connected to each other via a network NW. The network NW is formed by WAN (Wide Area Network), LAN (Local Area Network) and the like. The machine learning system 1 constructs a learning model of a machine learning based on the input of a user or executes an inference by the machine learning using the input of the user and the learning model.

The terminal device 200 receives the input from the user and transmits the inputted content to the machine learning device 100 via the network NW. In addition, the terminal device 200 receives the data transmitted from the machine learning device 100 via the network NW and provides the received data to the user.

(Hardware Configuration of Machine Learning Device 100)

Figure 2:
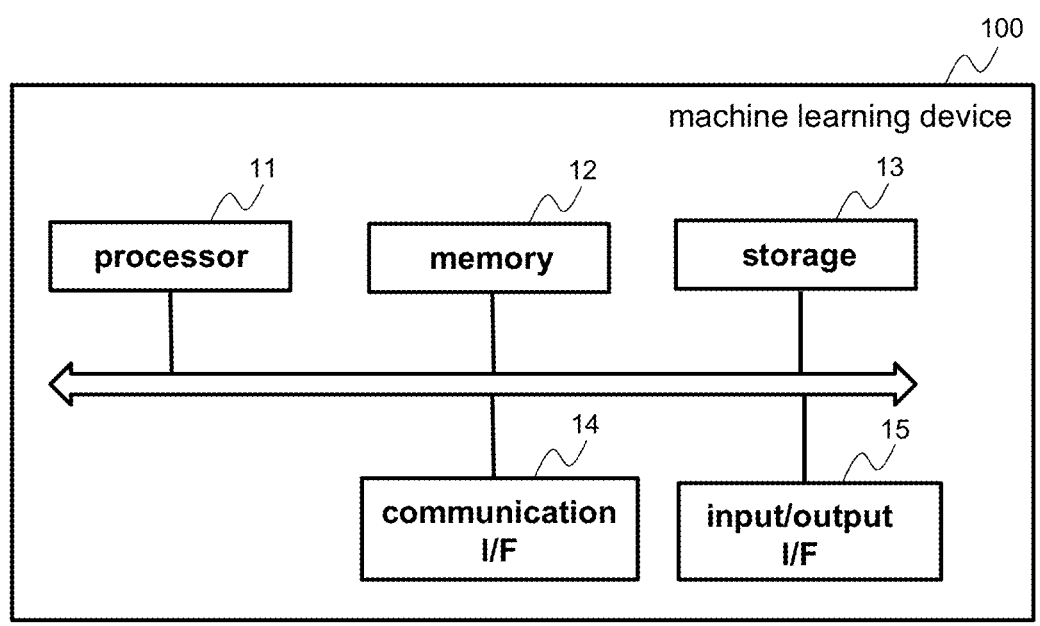
FIG. 2 is a drawing showing a hardware configuration of a machine learning device 100.

FIG. 2 is a drawing showing a hardware configuration of the machine learning device 100. The machine learning device 100 is a general purpose computer. The machine learning device 100 is achieved by a server computer, a stationary PC (Personal Computer) or a laptop PC, for example.

As shown in FIG. 2, the machine learning device 100 includes a processor 11, a memory 12, a storage 13, a communication I/F (interface) 14 and an input/output I/F (interface) 15.

The processor 11 is a hardware for executing the instruction set described in programs. The processor 11 is formed by a calculation device, a register, a peripheral circuit and the like. The memory 12 temporarily stores the programs, the data processed by the programs and the like. For example, the memory 12 is achieved by a volatile memory such as a DRAM (Dynamic Random Access Memory) and the like. The program stored in the memory 12 is, for example, a program executing the machine learning. The storage 13 is a storage unit for storing the data. For example, the storage 13 is achieved by a flash memory, HDD (Hard Disc Drive) and SSD (Solid State Drive). The communication I/F 14 is an interface for transmitting and receiving signals so that the machine learning device 100 can communicate with external devices. The input/output I/F 15 functions as an input device for receiving the input from the user and as an interface to an output device for providing the information to the user.

Note that the terminal device 200 can have the similar configuration as the hardware configuration shown in FIG. 2. Similar to the above described machine learning device 100, the operation of each component of the terminal device 200 is achieved by the processor 11 which is operated in accordance with the programs stored in the memory 12.

(Functional Configuration of Machine Learning Device 100)

Figure 3:
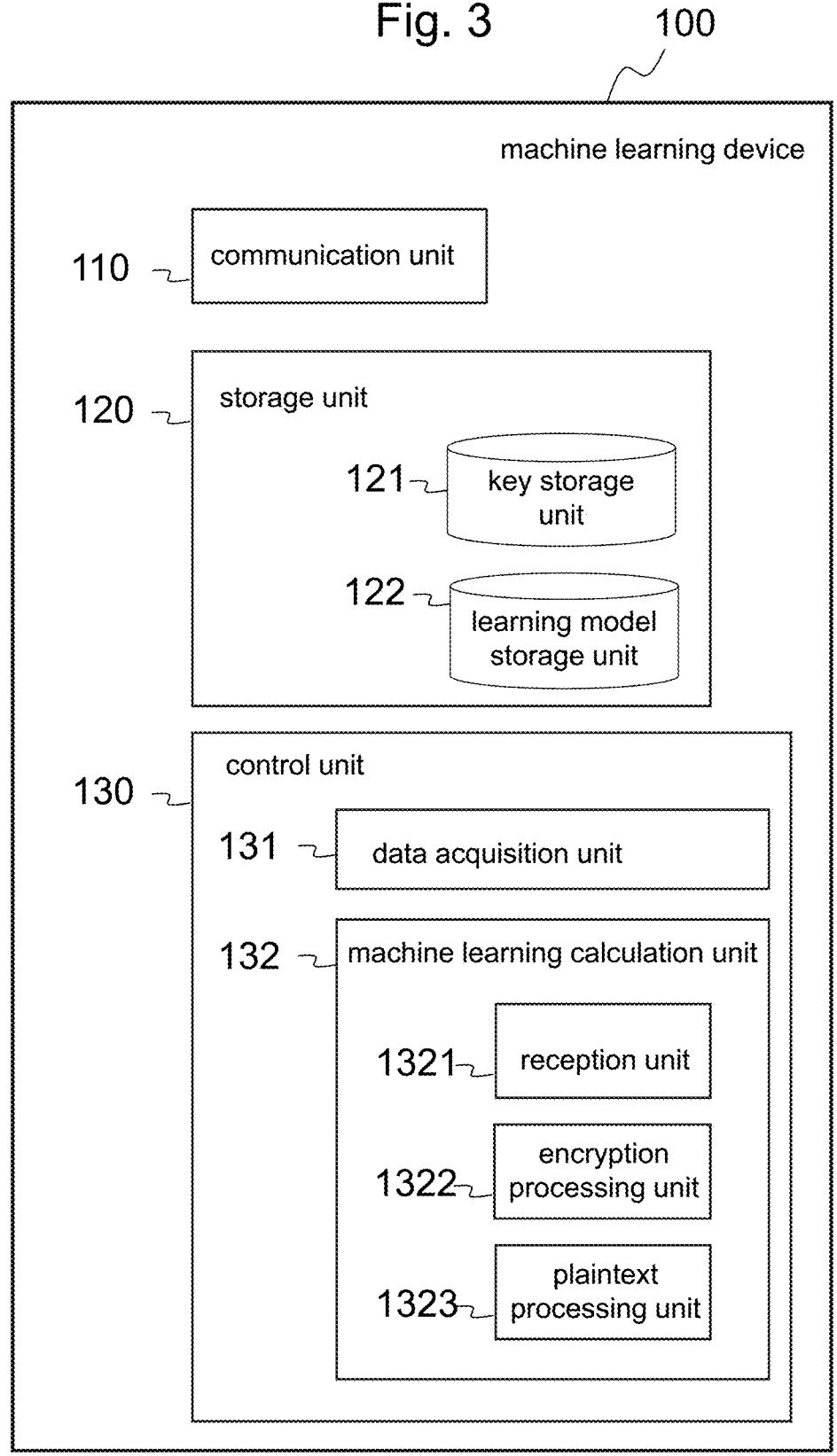
FIG. 3 is a block diagram showing a functional configuration of the machine learning device 100.

FIG. 3 is a block diagram showing a functional configuration of the machine learning device 100. The functional configuration of the machine learning device 100 of the embodiment 1 will be explained with reference to FIG. 3.

The machine learning device 100 includes a communication unit 110, a storage unit 120 and a control unit 130.

The communication unit 110 performs the processing for making the machine learning device 100 communicate with the other devices. The other devices mentioned here can be a PC connected via the network NW or a terminal such as a smart phone and a tablet. Alternatively, the other devices can be an input/output device such as a flash memory, HDD and SSD for inputting/outputting the data, for example.

In addition, the communication unit 110 transmits/receives the data to/from the devices connected via the network NW and the locally connected devices with a secure communication channel where security is ensured. The explanation of the method for constructing the secure communication channel and the communication method is omitted since they are well known technology using a common key (e.g., session key), a public key and the like.

The storage unit 120 is formed by a volatile memory such as a RAM, flash memory, HDD, SSD and the like. The storage unit 120 stores the data and the programs used by the machine learning device 100. The storage unit 120 includes, for example, a key storage unit 121 which stores the keys for encrypting the data or decrypting the encrypted data and a learning model storage unit 122 which stores the learning model used in the machine learning device 100 so that the later described encryption processing unit 1322 can execute the calculation in an encryption execution area. The keys can be also stored in a not illustrated key management device which is connected to the machine learning device 100 via a network or connected directly to the machine learning device 100 instead of storing the keys in the machine learning device 100. In addition, it is preferable to delete the image data and the like used for the machine learning by the machine learning device 100 from the storage unit 120 after the keys are used for improving the security.

The key storage unit 121 (shown in FIG. 4 described later) stores the keys used for encrypting the data or the keys used for decrypting the encrypted data so that the encryption processing unit 1322 executes the calculation in the encryption execution area. The key storage unit 121 stores a path of an ID, a key data and a key file, for example. As for the ID, the key can be used by assigning the key to each arbitral group such as an organization or a user. Alternatively, the key can be used by assigning the key to each session.

The learning model storage unit 122 (shown in FIG. 5 described later) stores the learning model used in the machine learning device 100. The learning model storage unit 122 can store an ID for distinguishing a plurality of learning models, a tag indicating an application range of the learning model, whether or not the learning model can specify a predetermined part in image diagnosis, a calculation cost (including calculation quantity, calculation time, cost, calculation resource and the like) and a calculation speed when the calculation is executed by using the learning model, an accuracy when the inference is executed by using the learning model and the like in association with each other in addition to the learning model.

The processor of machine learning device 100 reads the program stored in the storage unit 120 and executes the command included in the program. Thus, the control unit 130 is achieved. The control unit 130 controls the operations of the machine learning device 100. Specifically, the control unit 130 includes a data acquisition unit 131, a machine learning calculation unit 132, a reception unit 1321, an encryption processing unit 1322 and a plaintext processing unit 1323.

The data acquisition unit 131 acquires the image data which is a teacher data and acquires a label of the image data in the case where the parameters of the learning model are updated by the machine learning (hereafter, including the case of newly generating the learning model unless specifically mentioned). The "label" includes the label indicating the classification of the object shown by the image data and the label indicating the range (position) of the object to be identified by the image data, for example. In addition, the data acquisition unit 131 acquires the image data as the object of the inference when the inference is executed by using the learning model. For example, the user inputs the image data and the label in the terminal device 200 or the like, and the data acquisition unit 131 acquires the image data and the label inputted by the user via the network NW.

The machine learning calculation unit 132 executes a calculation processing (computation processing) using the convolutional neural network based on the image data or the like acquired in the data acquisition unit 131. The calculation processing is specifically the learning for updating the parameters of the learning model or the calculation for executing the inference from the acquired image data or the like using the learning model. Note that the convolutional neural network comprises a plurality of layers. The "layer" will be explained in FIG. 7 and FIG. 8 (later described).

The machine learning calculation unit 132 preliminarily acquires the range to be calculated in the encryption execution area from the user in the calculation processing, executes the calculation on a part of the calculation processing by the homomorphic encryption in the encryption execution area, and executes the calculation on the other parts of the calculation processing in the plaintext encryption area. The machine learning calculation unit 132 specifically includes the reception unit 1321, the encryption processing unit 1322 and the plaintext processing unit 1323.

The reception unit 1321 receives a layer designation information for designating an N-th layer which is an intermediate layer between an input layer and an output layer of the convolutional neural network (N is a natural number). Namely, when the N-th layer is designated by the layer designation information, the calculation is executed in the encryption execution area from the input layer to the N-th layer and the calculation is executed in the plaintext encryption area from the (N+1)-th layer to the output layer.

The reception unit 1321 receives the layer designation information for designating the N-th layer. Here, the layer designation information is the specific number indicating "N." The layer designation information indicates the range of the intermediate layer to which the calculation is executed in the encryption execution area in the convolutional neural network. The convolutional neural network generally includes a plurality of layers such as the input layer (0-th layer), the intermediate layers (first to M-th) layers and the output layer (M+1)-th layer. Here, M is an arbitrary natural number. At this time, the user determines that the calculation is executed in the encryption execution area from the input layer to the N-th layer of the intermediate layers, and the reception unit 1321 acquires N which is the boundary layer where the calculation is executed in the encryption execution area.

In addition, the layer designation information can be the information capable of designating "N" instead of the specific number indicating "N." For example, the layer designation information can be the condition of the calculation cost received from the user. When the reception unit 1321 receives the condition of the calculation cost as the layer designation information, the reception unit 1321 calculates "N" so that the calculation can be executed within the received calculation cost.

The encryption processing unit 1322 has the function of executing the calculation by the homomorphic encryption in the encryption execution area. The encryption processing unit 1322 executes the calculation processing by the homomorphic encryption in the encryption execution area from the input layer (0-th layer) to the N-th layer of the intermediate layers in the calculation processing in the machine learning calculation unit 132.

Specifically, the encryption processing unit 1322 encrypts the image data or the like acquired by the data acquisition unit 131 using the encryption key (public key) managed in the key storage unit 121. At this time, the encryption processing unit 1322 uses the homomorphic encryption scheme (e.g., Paillier scheme, Lifted-Elgamal scheme, Somewhat Homomorphic Encryption scheme, Fully Homomorphic Encryption scheme) as the encryption scheme since the calculation can be executed in the encrypted state.

The encryption processing unit 1322 encrypts the image data or the like acquired by the data acquisition unit 131 and the learning model used for the machine learning and executes the calculation in the encryption execution area.

After the encryption processing unit 1322 executes the calculation processing from the input layer (0-th layer) to the N-th layer of the intermediate layers designated by the user in the encryption execution area, the encryption processing unit 1322 decrypts the data using the decryption key (secret key) managed in the key storage unit 121.

The plaintext processing unit 1323 has the function of executing the calculation in the plaintext encryption area. The plaintext processing unit 1323 acquires the calculation result from the input layer to the N-th layer executed in the encryption processing unit 1322 and subsequentially executes the calculation from the (N+1)-th layer to the output layer in the plaintext encryption area. Consequently, the parameters of the inference or the learning model are updated.

Note that a part of the above described function of the machine learning device 100 can be executed in the terminal device 200. For example, it is possible to preliminarily share the key for encrypting the image data or the like by the homomorphic encryption between the machine learning device 100 and the terminal device 200 so that the image data, which is the object of the inference and the machine learning, is encrypted by the homomorphic encryption in the terminal device 200.

The terminal device 200 transmits the image data encrypted by the homomorphic encryption to the machine learning device 100. The machine learning device 100 stores the image data received via the communication unit 110 in the storage unit 120. The data acquisition unit 131 acquires the encrypted image data from the storage unit 120 and transmits it to the encryption processing unit 1322. Then, the encryption processing unit 1322 executes the calculation on the encrypted image data. At that time, the plaintext processing unit 1323 can decrypt the encryption result instead of the encryption processing unit 1322 as described above.

Namely, only the data encrypted by the homomorphic encryption is treated in the encryption processing unit 1322 in that case. By using the above described configuration of the machine learning device 100, the image data is encrypted by the homomorphic encryption or it is difficult to visually recognize the image by a human even if the image data is decrypted. Therefore, the machine learning device 100 can execute the calculation processing while enhancing the security.

(Concrete Example of Database)

Figure 4:
FIG. 4 is a drawing showing an example of a key storage unit 121.

FIG. 4 is a drawing showing an example of the key storage unit 121. The key storage unit 121 stores "ID" for identifying the scene (e.g., user, session) of using the key and the value of the key (public key "key 1" and secret key "key 2" in association with each other, for example. In FIG. 4, the public key for "ID" "000001" is "0KJFDEMNFS679FDDFHKL . . . " while the secret key is "2SFSHLJHFSKLJADL7DJLH . . . " Similarly, the public key for "ID" "000002" is "43JFLKEJFDHKLFS3JKLFN . . . " while the secret key is "FDLK732492SFGKJHKSDH . . . " The public key for "ID" "000003" is "JLKJ02SFHL89JLKHJKF897 . . . " while the secret key is "40389439LFKSJFLKJFSLH . . . " Note that FIG. 4 is merely an example of the key management. The method of managing the key is not limited to FIG. 4. For example, it is possible to store the key in association with the user having the decryption authority.

Figure 5:
FIG. 5 is a drawing showing an example of a learning model storage unit 122.

FIG. 5 is a drawing showing an example of the learning model storage unit 122. The learning model storage unit 122 stores "ID" for identifying a plurality of learning models, "tag" for indicating an application range or the like of the learning model, "part identification" for distinguishing whether or not the learning model can specify a predetermined part in image diagnosis, "cost/MB" for indicating a cost (calculation quantity) when the calculation is executed by using the learning model, "calculation speed/Mb" for indicating the calculation speed, "accuracy" for indicating the accuracy when the inference is executed by using the learning model and "file" for indicating the file name of the learning model.

In FIG. 5, the learning model having "ID" of "0001" has "tag" of "CT, cancer, kidney, medical, image diagnosis," the learning model can be applied to the above described purposes and not compatible with the specific part. In addition, the learning model having "ID" of "0001" shows the state that "cost" is 10 yen/Mb, "calculation speed" is 5'10 per 1 Mb, "accuracy" is 80%, and the learning model itself is stored in the file of "0001.json."

In FIG. 5, the learning model having "ID" of "0002" has "tag" of "CT, cancer, kidney, medical, image diagnosis," the learning model can be applied to the above described purposes and compatible with the specific part since "part identification" is "○."

In addition, the learning model having "ID" of "0002" shows the state that "cost" is 45 yen/Mb, "calculation speed" is 6'00 per 1 Mb, "accuracy" is 85%, and the learning model itself is stored in the file of "0002.json."

The explanation of the learning models having "ID" of "0003" and "0004" is omitted since the explanation is similar. Note that the items stored in the learning model storage unit 122 are not limited to the above described items. The learning model can be stored in association with the organization (e.g., company, department), the business field (e.g., medical, food, EC) and the owner to which the learning model is applied.

(Concrete Example of Image Data and Label)

Figure 6:
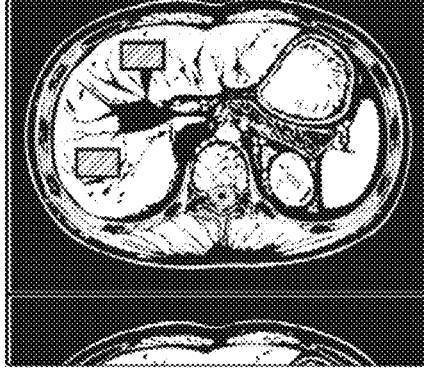
FIG. 6 is a drawing showing an example of a screen for inputting an image data and a label inputted by a user.

FIG. 6 is a drawing showing an example of a screen for inputting the image data and the label inputted by a user. When the data acquisition unit 131 receives the input of the image data which is the object, the data acquisition unit 131 reads the image data and displays an image 410 and a file information (e.g., file name, file generation date) on the terminal device 200 operated by the user as shown in a screen 401. At this time, the data acquisition unit 131 also acquires the label from the user. In the screen 401, the user selects whether the inputted image data is the data showing "normal" or the data showing "abnormal" for labeling the image data. When the user labels the learning model for identifying the abnormal portion, the user selects the range of the abnormal portion on the screen for labeling the image data. For example, the specified range is shown by oblique lines in the screen 410 in FIG. 6.

As described above, the data acquisition unit 131 acquires the teacher data to which the image data and the label of the image data are associated. The machine learning calculation unit 132 generates (updates) the parameters of the learning model of the convolutional neural network so that the label of the image data is outputted based on the teacher data. For example, when diagnosing the cancer about the inputted image data, whether the image data indicates normal or abnormal (suspicion of cancer) is outputted as the label. It is also possible to also output the specific portion when there is a suspicion of cancer.

When only the image data is inputted for executing the inference, the labeling is not required and only the image data is inputted.

(Example of Convolutional Neural Network)

Figure 7:
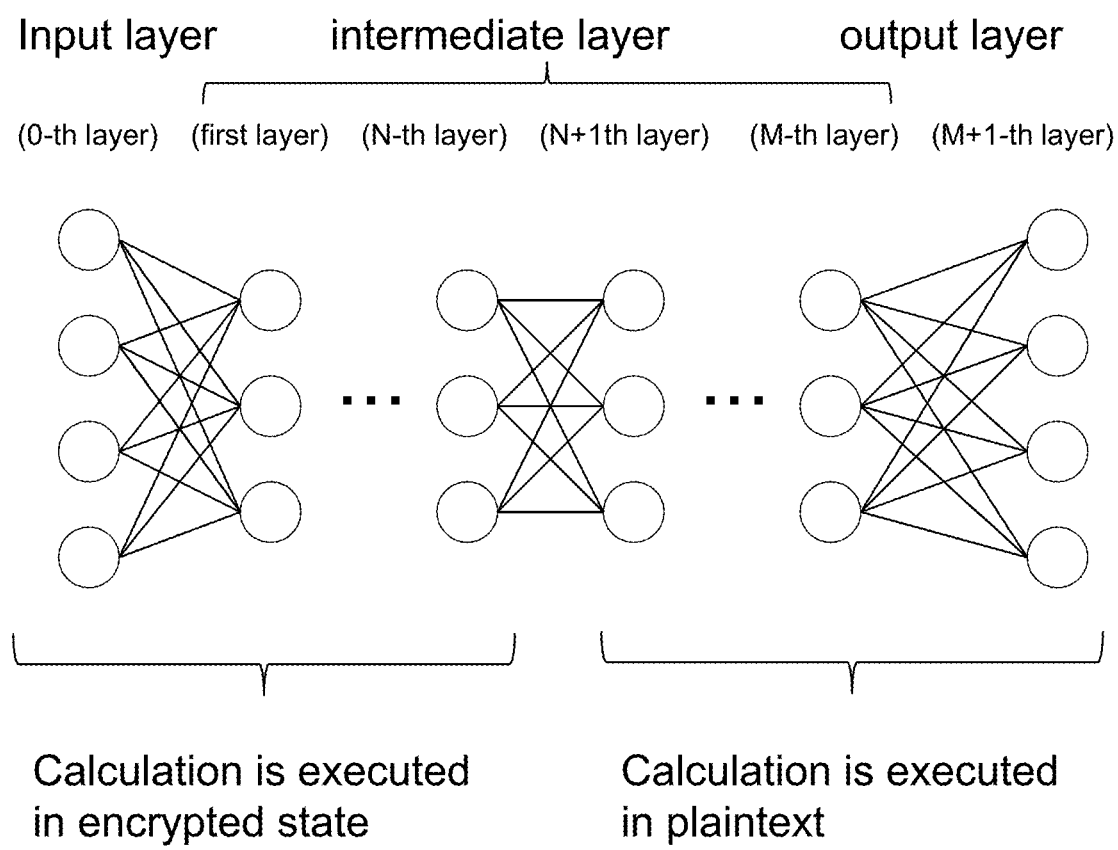
FIG. 7 is a model schematic diagram of a general convolutional neural network.

FIG. 7 is a model schematic diagram of the general convolutional neural network. The neural network includes a plurality of layers such as the input layer (0-th layer), the intermediate layers (1st layer to M-th layer) and the output layer ((M+1)-th layer). The machine learning calculation unit 132 acquires the layer designation information indicating a boundary (N-th layer) of the range where the reception unit 1321 executes the calculation in the encryption execution area in the calculation processing. The encryption processing unit 1322 executes the calculation in the encryption execution area while the plaintext processing unit 1323 executes the calculation in the plaintext encryption area.

The encryption processing unit 1322 encrypts the image data or the like acquired by the data acquisition unit 131 and the selected learning model by the homomorphic encryption using the key (public key) stored in the key storage unit 121 and executes the calculation for the inference or the update of the parameters of the learning model in the encryption execution area. Specifically, the encryption processing unit 1322 executes the calculation processing from 0-th layer to the N-th layer of the intermediate layers. In addition, the encryption processing unit 1322 decrypts the calculation result executed in the encryption execution area by using the key (secret key paired with the encrypted public key) stored in the key storage unit 121. The decrypted result can be transmitted to the plaintext processing unit 1323. When the calculation result executed in the encryption execution area is stored in the storage unit 120, it is preferred that calculation result is stored in the encrypted state and decrypted in the plaintext processing unit 1323 for security reasons.

The plaintext processing unit 1323 executes the calculation on the calculation processes from the (N+1)-th layer to the (M+1)-th layer in the plaintext encryption area using the image data or the like and the learning model decrypted by the encryption processing unit 1322.

Figure 8:
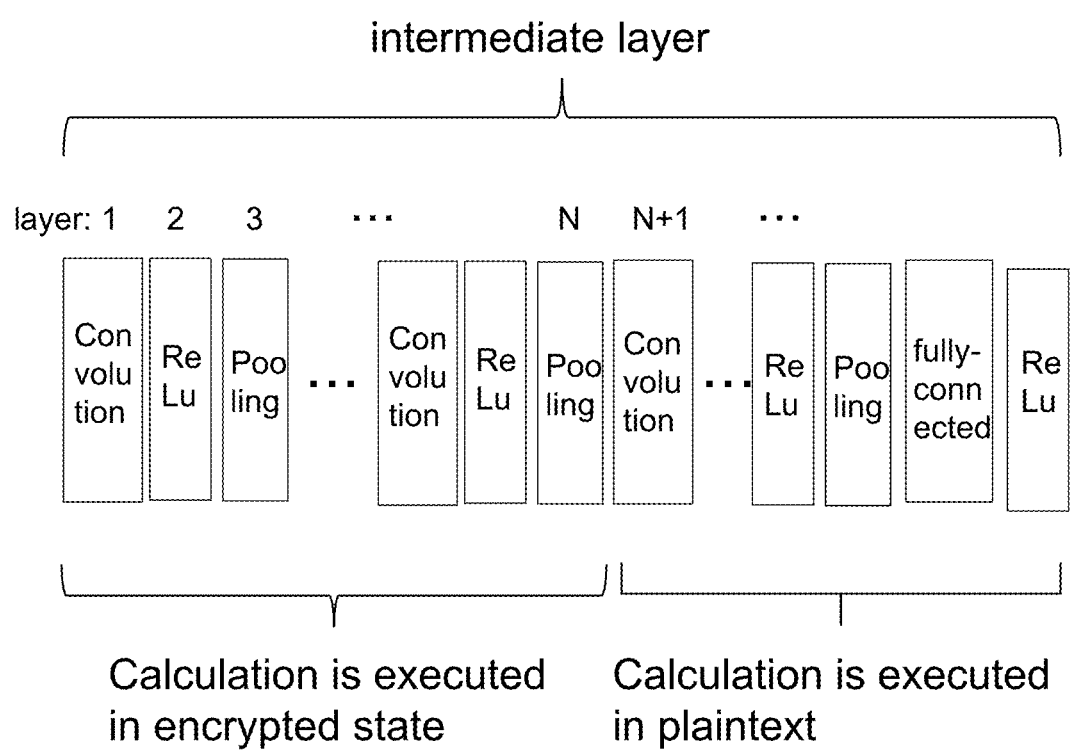
FIG. 8 is a drawing specifically showing an intermediate layer.

FIG. 8 is a drawing specifically showing the intermediate layer. The convolutional neural network generally includes a Convolution layer for executing the convolution operation, a ReLu layer, a Pooling layer, a fully-connected layer and the like as the intermediate layer. In "layer" of the present invention, it is possible to form the Convolution layer, the ReLu layer and the Pooling layer as the 1st layer, the 2nd layer and the 3rd layer respectively. Alternatively, it is also possible to consider a series of the processing of the Convolution layer, the ReLu layer and the Pooling layer as one processing unit and form each of the 1st layer, the 2nd layer and the 3rd layer by the series of the processing. In this case, the combination of "Convolution," "ReLu" and "Pooling," the combination of "Convolution" and "Pooling" or the combination of "ReLu" and "Pooling" can be treated as one layer, for example.

In the convolutional neural network, the fully-connected layer is generally used in a latter half of the intermediate layer in many cases. However, it is also possible to use the fully-connected layer in the encryption execution area.

(Flow of Processing)

Figure 9:
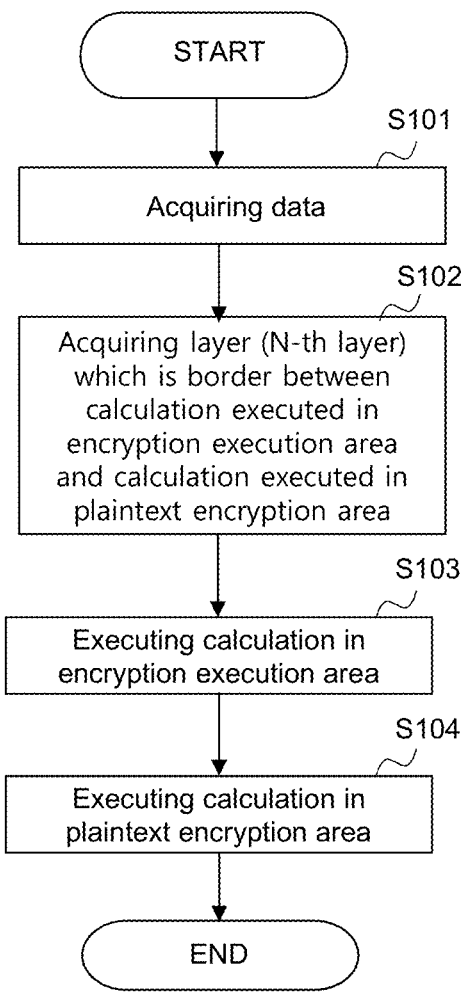
FIG. 9 is a flow chart showing an example of the processing executed by the machine learning device 100.

FIG. 9 is a flow chart showing an example of the processing executed by the machine learning device 100.

The control unit 130 acquires the data such as the image data or the data and label of the image data or the like from the terminal device 200 via the communication unit 110 (Step S101).

The control unit 130 acquires the layer designation information for designating the N-th layer which is the border between the calculation executed in the encryption execution area and the calculation executed in the plaintext encryption area from the terminal device 200 via the communication unit 110 (Step S102).

The control unit 130 encrypts the acquired image data or the like and the learning model to be applied by the homomorphic encryption. Then, the control unit 130 executes the calculation from the 0-th layer to the N-th layer in the encryption execution area and then decrypts the calculation result (Step S103).

The control unit 130 executes the calculation from the (N+1)-th layer to the output layer in the plaintext encryption area based on the calculation result decrypted in Step S103 and updates the parameters of the inference or the learning model. Then, the control unit 130 stores the calculation result in the storage unit 120 and the processing is finished (Step S104).

(Explanation of Effect)

In the machine learning device 100 of the present embodiment, a part of the calculation of the machine learning is executed in the encryption execution area and executes the other parts of the calculation in the plaintext encryption area. Because of this, compared to the case where all calculation is executed in the encryption execution area, the calculation cost can be reduced and the calculation can be executed within a realistic time.

In the machine learning model using the convolutional neural network, since the filtering processing of the convolution operation is generally repeated in the process of the intermediate layer, the image data inputted to the input layer becomes difficult to be visually recognized. Namely, since it is difficult for the human to recognize the input data after the convolution operation is repeated, there is little risk of information leakage even when the data is not encrypted. The machine learning device 100 of the present embodiment focused on the above described point. Thus, the calculation is executed in the encryption execution area from the input layer to the N-th layer designated by the user, while the calculation is executed in the plaintext encryption area from the (N+1)-th layer to the output layer. Consequently, the calculation cost can be reduced while enhancing the security.

Embodiment 2

In the machine learning system 1 of Embodiment 1, after the layer designation information is acquired from the user, the calculation processing is executed in the encryption execution area and the plaintext encryption area. On the other hand, in a machine learning system 2 of Embodiment 2, when the user designates the layer designation information, the information how the input image is changed or how the calculation cost is changed when the input image is calculated by the convolution operation in the plaintext encryption area is provided to the user. The user can refer to the provided information and easily designate the layer designation information corresponding to the calculation cost and the security level required by each user.

(Configuration of Machine Learning System 2)

Figure 10:
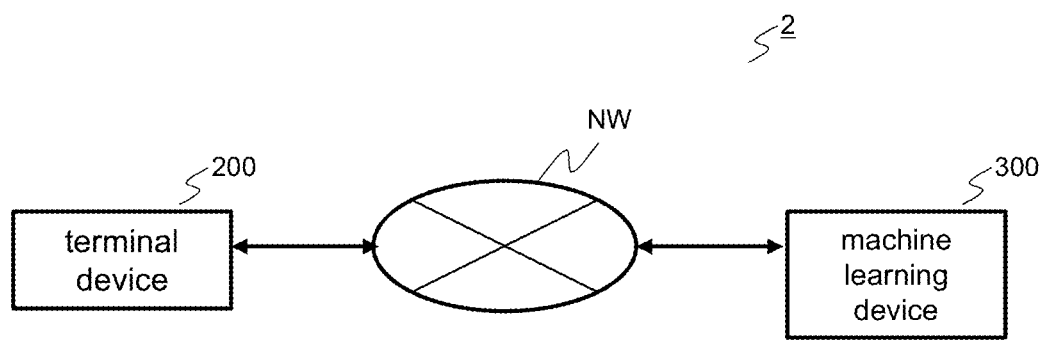
FIG. 10 is a drawing showing a machine learning system 2.

FIG. 10 is a drawing showing the machine learning system 2. As shown in FIG. 10, the machine learning system 2 of the present embodiment includes a machine learning device 300 and one or more terminal devices 200 used by users. Compared to the machine learning device 100 of Embodiment 1, the machine learning device 300 further includes a provision unit 3324 and an estimation unit 3325 (described in detail in FIG. 11). The provision unit 3324 has the function of assisting the user to select the range of executing the calculation in the encryption execution area by showing the information how the image data inputted by the user is changed when the calculation is executed in the plaintext encryption area and the information of the calculation cost or the like.

(Functional Configuration of Machine Learning Device 300)

Figure 11:
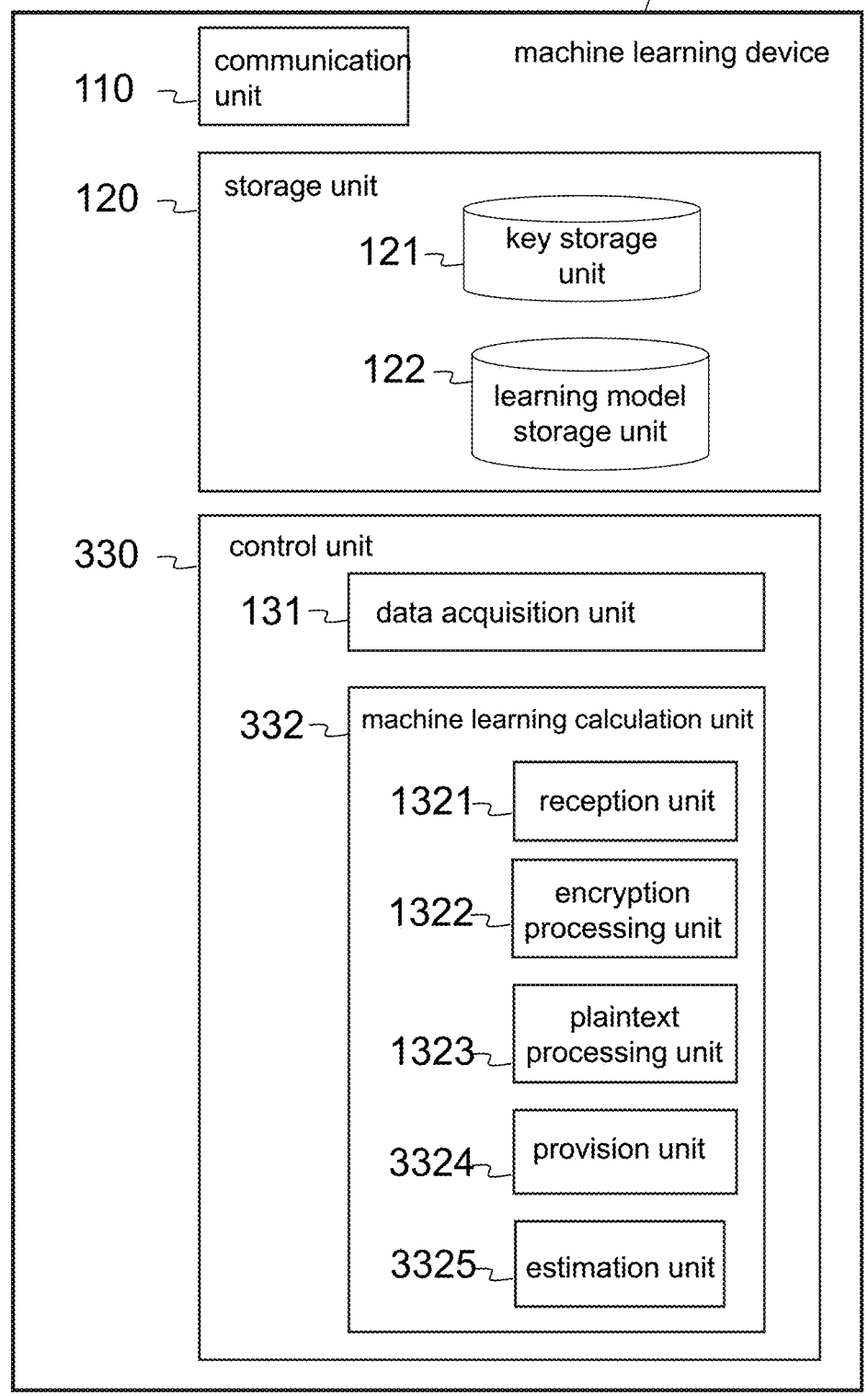
FIG. 11 is a block diagram showing a functional configuration of a machine learning device 300.

FIG. 11 is a block diagram showing a functional configuration of the machine learning device 300. The machine learning device 300 includes a communication unit 110, a storage unit 120 and a control unit 330. The explanation of the functional configuration of the communication unit 110 and the storage unit 120 in the machine learning device 300 is omitted since it is same as that of the machine learning device 100.

The processor of machine learning device 300 reads the program stored in the storage unit 120 and executes the command included in the program. Thus, the control unit 330 is achieved. The control unit 330 controls the operations of the machine learning device 300. Specifically, the control unit 330 includes a data acquisition unit 131, a machine learning calculation unit 332, a reception unit 1321, an encryption processing unit 1322, a plaintext processing unit 1323, a provision unit 3324 and estimation unit 3325. The control unit 330 is same as the control unit 130 of the machine learning device 100 except for that the control unit includes the provision unit 3324 and the estimation unit 3325. Thus, duplicate explanation will be omitted.

The provision unit 3324 provides a plaintext intermediate calculation information which is related to the calculation from the input layer to the output layer executed by the plaintext processing unit 1323 on the image data inputted by the user and acquired by the data acquisition unit 131. The plaintext intermediate calculation information is the information related to the calculation in the intermediate process from the input layer to the output layer. The plaintext intermediate calculation information includes the data inputted or outputted in the intermediate layer in the plaintext encryption area, the calculation time (and estimated total time required for the inference or the learning) required for executing the calculation until the intermediate layer, the calculation quantity (and estimated total calculation quantity required for the inference or the learning) required for executing the calculation until the intermediate layer and the fee calculated from the calculation quantity, for example. The plaintext intermediate calculation information can be calculated based on the information related to the calculation calculated by executing the calculation on one image data inputted by the user from the input layer to the output layer by the plaintext processing unit 1323, for example. The plaintext intermediate calculation information can be transmitted to the terminal device 200 used by the user via the communication unit 110, for example. Alternatively, the plaintext intermediate calculation information can be displayed on a not illustrated display device in the machine learning device 100.

The provision unit 3324 can provide a difference of the information between the image data inputted to the input layer and the data inputted to each layer from the input layer to the output layer as the plaintext intermediate calculation information in a manner where the user can compare the data, for example. It is not necessary for the provision unit 3324 to provide the image data in a manner where the user can compare the data. It is also possible to provide the image data inputted to each layer as the plaintext intermediate calculation information.

The provision unit 3324 provides the reference information (difference of information) for determining the layer whose image data can be visually recognized by providing the image data inputted to each layer while assuming that the image data becomes visually unrecognizable when the convolution operation is repeated. Sometimes, the provision unit 3324 provides the information for determining the layer required for executing the machine learning in the encrypted state by comparison. For example, it is possible to provide a sample image data inputted to the first layer which is an intermediate layer and a sample image data inputted to the second layer in which the processing is executed after the first layer to the user. Consequently, the user can compare how the sample image data is changed by the processing of each layer and how the difference of the information appears. Thus, the user is assisted to designate the layer designation information.

It is not necessary for the provision unit 3324 to provide all of the inputted image data from the input layer to the output layer. It is possible to provide the image data inputted when the calculation is executed by the encryption processing unit 1322 and the image data inputted when the calculation is executed by the plaintext processing unit 1323 in a manner where the user can compare the data about a plurality of predetermined layers from the input layer to the output layer. When selecting a plurality of predetermined layers, it is possible to select the layers with the periodicity. For example, it is possible to extract one layer for each five layers. Alternatively, it is possible to extract a plurality of layers randomly.

It is also possible for the provision unit 3324 to provide a mask image instead of the image data inputted to the intermediate layer when the calculation is executed by the encryption processing unit 1322. Namely, since the image data inputted when the calculation is executed by the encryption processing unit 1322 is encrypted, the inputted image data is the data unrecognizable by the human. Thus, there is little necessity to show the image data. Instead, it is possible to show the mask image for indicating that the data is unrecognizable by the human.

It is possible for the provision unit 3324 to provide the calculation cost in condition that the calculation is executed by the encryption processing unit 1322 from the input layer to the predetermined layer and the calculation is executed by the plaintext processing unit 1323 from the next layer of the predetermined layer to the output layer in a manner where the user can compare the calculation cost, for example. The provision unit 3324 provides the user the calculation time and/or the calculation quantity, for example, in condition that the calculation is executed in the encryption execution area from the input layer to the predetermined layer and the calculation is executed in the plaintext encryption area for the rest layers. Thus, the provision unit 3324 can provide the information for determining the layer in which the machine learning is executed in the encrypted state.

The provision unit 3324 can provide a layer designation estimation information calculated by the estimation unit 3325 (later described). The layer designation estimation information is the information calculated based on a correlation between the data related to the image data acquired by the data acquisition unit 131 and the layer designation information designated for the image data. The layer designation estimation information can be the value specifically identifying the N-th layer or the range of N, for example.

The estimation unit 3325 learns the correlation between the data related to the image data acquired by the data acquisition unit and the layer designation information designated for the image data. The data related to the image data is, for example, the business field (e.g., medical, food, EC), the content (diagnosis, marketing), the organization and the user using the image data. The estimation unit 3325 learns the correlation to the data related to the image data about the encrypted layer (which layers are encrypted). As the result of the learning, the estimation unit 3325 calculates the layer designation information correlated to the data related to the inputted image data as the layer designation estimation information. As described above, the provision unit 3324 provides the layer designation estimation information calculated by the estimation unit 3325 together with the plaintext intermediate calculation information to the user. Thus, the user can refer to the layer designation estimation information when designating the layer designation information. Consequently, the user can designate the layer designation information easily.

(Specific Example of Plaintext Intermediate Calculation Information Provided by Provision Unit 3324)

Figure 12:
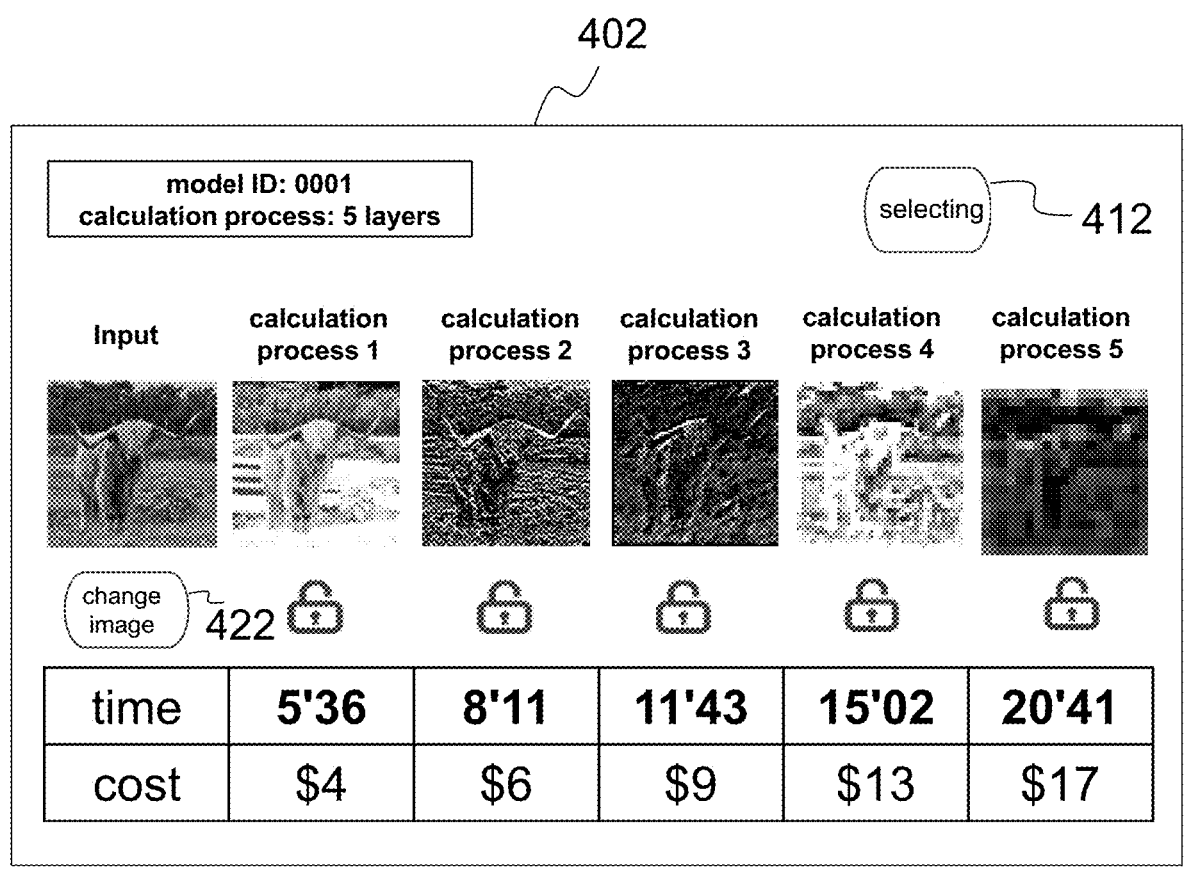
FIG. 12 is a drawing showing an example of a screen provided by a provision unit 3324.

FIG. 12 is a drawing showing an example of a screen provided by the provision unit 3324. When the calculation is executed by the plaintext processing unit 1323, a screen 402 displays the image data (image showing "caw") inputted to each layer of five layers of calculation process and an icon 412 showing a state that the user is "selecting" the range where the calculation is executed in the encryption execution area.

In FIG. 12, the input image inputted by the user is displayed in "Input." In addition, the screen 402 displays the input images in a plurality of layers (calculation processes 1 to 5) as the plaintext intermediate calculation information. In general, in the convolutional neural network, when the filtering processing of the convolution operation is repeated, the input screen becomes difficult to be visually recognized. Thus, the image is difficult to be recognized as the layer becomes deeper. For example, the input image (Input) of the screen 402 is a caw, the image shown in "Input" and the image shown in the calculation process 1 cannot be visually distinguished. On the other hand, the outline of the caw cannot be seen in the images shown in the calculation processes 3 to 5 and it is difficult to visually recognize the object shown by the image.

In addition, the screen 402 shows not only the image data inputted to the plurality of layers but also the calculation time "Time" and the cost "Cost" in condition that the calculation is executed in the encryption execution area from the input layer to the intermediate layer and the calculation is executed in the plaintext encryption area after the intermediate layer. For example, "Time" is "5'36" and "Cost" is "$4" in the calculation process 1. Namely, it is shown that the calculation time is "5'36" and the cost is "$4" when the calculation is executed in the encryption execution area from the input layer to the intermediate layer and the calculation is executed in the plaintext encryption area after the intermediate layer. As the layer of the process of the convolutional neural network becomes deeper (as the calculation process is advanced from 1 to 5), the calculation quantity executed in the encryption execution area increases and the calculation time and the cost increase. Although the calculation time and the cost are provided as the calculation cost in FIG. 12, it is also possible to provide the calculation quantity, the calculation resource and the like to the user as the calculation cost.

In addition, when the user clicks the button 422, for example, it is possible to change the above described input image of "caw" to another image, a sample image preliminarily prepared as a platform or an image such as an illustration showing the difference of the information amount. In this case, the plaintext intermediate calculation information is provided based on the above described sample image or the like.

Figure 13:
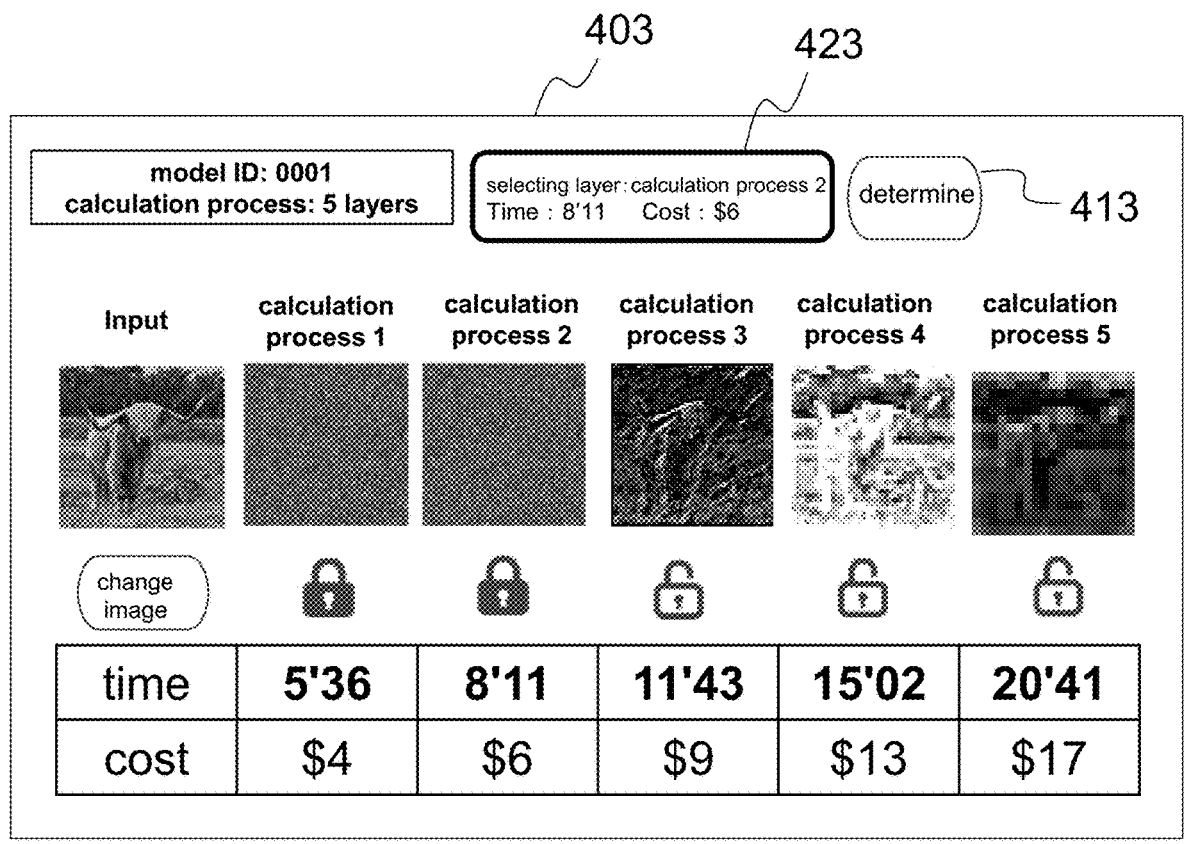
FIG. 13 is a drawing showing an example of a screen provided by the provision unit 3324.

FIG. 13 is a drawing showing an example of a screen provided by the provision unit 3324. The area 413 of the screen 403 shows that the user selects "Calculation process 2" as the range where the calculation is executed in the encryption execution area. In addition, the user can input "Calculation process 2" as the layer designation information by clicking "Decide" button 423, for example. The layer can be designated by clicking the image data shown in each calculation process or an icon (key icon shown in FIG. 13) shown below the image data or by using a keyboard or voice, for example.

In FIG. 13, the image data of the layers before the calculation process 2 which is the layer selected by the user as a mask image. When the calculation is executed in the encryption execution area from the input layer to the predetermined layer, the image data inputted to these layers is encrypted. Thus, the image data cannot be recognized by the human and there is little necessity to show the encrypted image data to the user. When the mask image is displayed instead of the image data, the calculation in the encryption execution area can be reduced. However, in order to help the user to image the calculation result easily, it is possible to display the calculation result in the encryption execution area.

(Flow of Processing)

Figure 14:
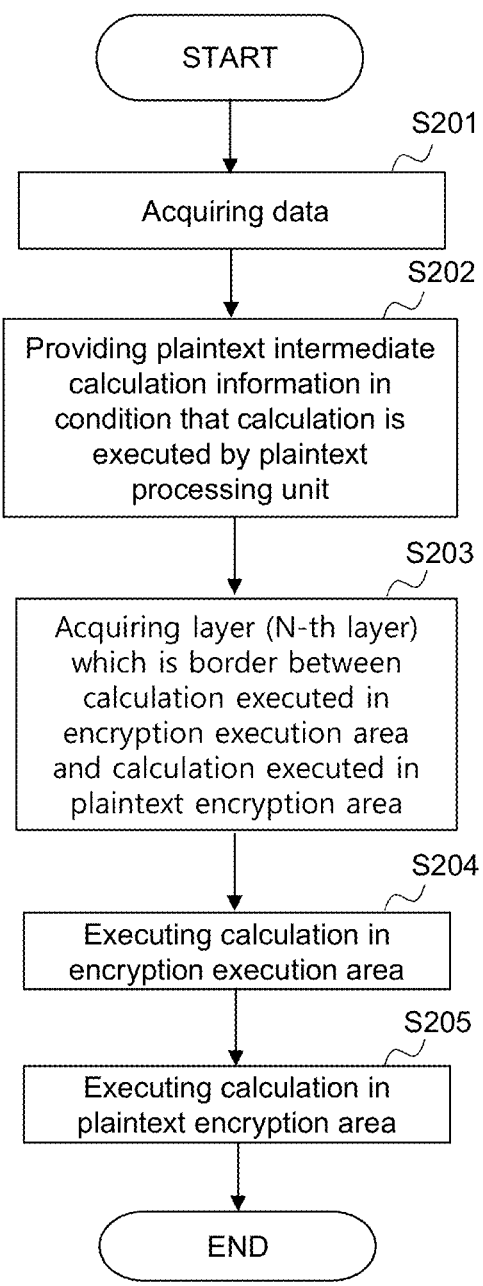
FIG. 14 is a flow chart showing an example of the processing executed by the machine learning device 300.

FIG. 14 is a flow chart showing an example of the processing executed by the machine learning device 300.

The control unit 130 acquires the data such as the image data or the data such as the image data together with the label from the terminal device 200 via the communication unit 110 (Step S201).

The control unit 130 provides the plaintext intermediate calculation information related to the calculation to the terminal device 200 in condition that the calculation is executed by the plaintext processing unit 1323 from the input layer to the output layer via the communication unit 110 (Step S202).

The control unit 130 acquires the layer designation information for designating the N-th layer which is the border between the calculation executed in the encryption execution area and the calculation executed in the plaintext encryption area from the terminal device 200 via the communication unit 110 (Step S203).

The control unit 130 encrypts the acquired data such as the image and the learning model to be applied by the homomorphic encryption. The calculation is executed in the encryption execution area from 0-th to N-th layer and then the calculation result is decrypted (Step S204).

The control unit 130 executes the calculation in the plaintext encryption area from the (N+1)-th layer to the output layer based on the calculation result decrypted in Step S204 and updates the parameters of the inference or the learning model. Then, the control unit 130 stores the calculation result in the storage unit 120 and the processing is finished (Step S205).

(Explanation of Effect)

The machine learning device 300 of the present embodiment provides the plaintext intermediate calculation information to the user when the calculation of the inputted image is executed in the plaintext encryption area in condition that a part of the calculation of the machine learning is executed in the encryption execution area and the other of the calculation is executed in the plaintext encryption area. When the user refers to the plaintext intermediate calculation information, the user can select the border layer depending on the practical calculation cost and the security level desired by the user.

Although the explanation of the embodiment is finished above, the above described embodiment is merely an example. Therefore, the specific configuration, the processing content and the like of the machine learning devices 100, 300 are not limited to those of the above described embodiment.

In addition, the functions of the machine learning device of the present disclosure can be also achieved by executing the program by the computer without using the above described device, for example. The program for achieving the function of the data sharing system can be stored in a computer-readable storage medium such as USB (Universal Serial Bus) memory, CD-ROM (Compact Disc-Read Only Memory), DVD (Digital Versatile Disc), HDD (Hard Disc Drive), SSD (Solid State Drive) or downloaded to the compute via a network.

Although the preferable embodiment of the present disclosure is explained above, the above described embodiment can be carried out in other various forms. Various omission, replacement and change can be applied within the range not deviating from the summary of the present invention. The embodiments and the variation of them are included in the range and summary of the present invention and also included in the invention described in the claims and the range equivalent to them.

DESCRIPTION OF THE REFERENCE NUMERALS

1: machine learning system; 2: machine learning system; 11: processor; 12: memory; 13: storage; 14: communication I/F; 15: input/output I/F; 100: machine learning device; 110: communication unit; 120: storage unit; 130: control unit; 131: data acquisition unit; 132, 332: machine learning calculation unit; 200: terminal device; 300: machine learning device; 330: control unit; 401, 402, 403: image; 410: image; 412: icon; 413: area; 423: button; 1321: reception unit; 1322: encryption processing unit; 1323: plaintext processing unit; 3324: provision unit; 3325: estimation unit

The invention claimed is:

1. A machine learning device, comprising:
a data acquisition unit configured to acquire an image data;
a machine learning calculation unit configured to execute a calculation based on the image data using a convolutional neural network; and
a control unit configured to control operations of the machine learning device, wherein
the convolutional neural network comprises a plurality of layers,
the machine learning calculation unit includes:
an encryption processing unit configured to execute the calculation based on the image data in a state that the image data is encrypted by a homomorphic encryption in an encryption execution area;
a plaintext processing unit configured to execute the calculation based on the image data in a state that the image data is decrypted in a plaintext encryption area;
a reception unit configured to receive a layer designation information for designating an N-th layer which is an intermediate layer between an input layer and an output layer of the convolutional neural network; and
a provision unit configured to provide a plaintext intermediate calculation information related to the calculation of the inputted image data from the input layer to the output layer when the calculation is executed by the plaintext processing unit,
the control unit is configured to make the encryption processing unit to execute the calculation from the input layer to the N-th layer and make the plaintext processing unit execute the calculation from the (N+1)-th layer to the output layer based on the layer designation information, and
the provision unit is configured to provide at least one of a calculation time, a calculation quantity and a calculation cost of executing the calculation from the input layer to a predetermined layer by the encryption processing unit and executing the calculation from a next layer of the predetermined layer to the output layer by the plaintext processing unit in a state that at least one of the calculation time, the calculation quantity and the calculation cost can be compared by a user.

2. The machine learning device according to claim 1, wherein
the data acquisition unit is configured to acquire a teacher data in which the image data is in association with a label corresponding to the image data, and
the machine learning calculation unit is configured to generate a parameter of a learning model of the convolutional neural network so as to output the label of the image data based on the teacher data.

3. The machine learning device according to claim 1, wherein
the provision unit is configured to provide a difference between the image data inputted to the input layer and a data inputted to each of the plurality of layers from the input layer to the output layer as the plaintext intermediate calculation information in a state that the difference can be compared by a user.

4. The machine learning device according to claim 1, wherein
the provision unit is configured to provide the image data inputted to each of the plurality of layers as the plaintext intermediate calculation information.

5. The machine learning device according to claim 1, wherein
the provision unit is configured to provide the image data inputted when the calculation is executed by the encryption processing unit and the image data inputted when the calculation is executed by the plaintext processing unit for a plurality of predetermined layers from the input layer to the output layer in a state that the image data can be compared by a user.

6. The machine learning device according to claim 5, wherein
the provision unit is configured to provide a mask image instead of the image data inputted when the calculation is executed by the encryption processing unit.

7. The machine learning device according to claim 1, further comprising:
an estimation unit configured to execute a learning about a correlation between a data related to the inputted image data acquired by the data acquisition unit and a layer designation information designated for the image data, wherein
the estimation unit is configured to calculate the layer designation information correlated to the data related to the inputted image data as a layer designation estimation information based on a result of the learning, and
the provision unit is configured to provide the layer designation estimation information calculated by the estimation unit.

8. A machine learning system, comprising:
a data acquisition unit configured to acquire an image data; and
a machine learning calculation unit configured to execute a calculation based on the image data using a convolutional neural network; and
a control unit configured to control operations of the machine learning system, wherein
the convolutional neural network comprises a plurality of layers,
the machine learning calculation unit includes:
an encryption processing unit configured to execute the calculation based on the image data in a state that the image data is encrypted by a homomorphic encryption in an encryption execution area;
a plaintext processing unit configured to execute the calculation based on the image data in a state that the image data is decrypted in a plaintext encryption area; and
a reception unit configured to receive a layer designation information for designating an N-th layer which is an intermediate layer between an input layer and an output layer of the convolutional neural network; and
a provision unit configured to provide a plaintext intermediate calculation information related to the calculation of the inputted image data from the input layer to the output layer when the calculation is executed by the plaintext processing unit,
the control unit is configured to make the encryption processing unit to execute the calculation from the input layer to the N-th layer and make the plaintext processing unit execute the calculation from the (N+1)-th layer to the output layer based on the layer designation information, and
the provision unit is configured to provide at least one of a calculation time, a calculation quantity and a calculation cost of executing the calculation from the input layer to a predetermined layer by the encryption processing unit and executing the calculation from a next layer of the predetermined layer to the output layer by the plaintext processing unit in a state that at least one of the calculation time, the calculation quantity and the calculation cost can be compared by a user.

9. A machine learning method, comprising:
a step of acquiring an image data; and
a step of executing a calculation based on the image data using a convolutional neural network, wherein
the convolutional neural network comprises a plurality of layers,
the step of executing the calculation based on the image data using the convolutional neural network includes:
a step of executing the calculation by a homomorphic encryption based on the image data in a state that the image data is encrypted in an encryption execution area;
a step of executing the calculation based on the image data in a state that the image data is decrypted in a plaintext encryption area; and
a step of receiving a layer designation information for designating an N-th layer which is an intermediate layer between an input layer and an output layer of the convolutional neural network,
the calculation from the input layer to the N-th layer is executed in the encryption execution area,
the calculation from the (N+1)-th layer to the output layer is executed in the plaintext encryption area, and
at least one of a calculation time, a calculation quantity and a calculation cost of executing the calculation from the input layer to a predetermined layer by the encryption processing unit and executing the calculation from a next layer of the predetermined layer to the output layer by the plaintext processing unit is provided in a state that at least one of the calculation time, the calculation quantity and the calculation cost can be compared by a user.

* * * * *